United States Patent [19]

Thomas et al.

[11] Patent Number: 4,493,067

[45] Date of Patent: Jan. 8, 1985

[54] SEISMIC VIBRATOR CONTROL SYSTEM

[75] Inventors: Bobby J. Thomas; Billy J. Heath, both of Ponca City, Okla.

[73] Assignee: Conoco Inc., Ponca City, Okla.

[21] Appl. No.: 253,207

[22] Filed: Apr. 13, 1981

[51] Int. Cl.³ .................... G01V 1/155; G01V 1/143
[52] U.S. Cl. .................................... 367/189; 181/107
[58] Field of Search ...................... 367/23, 41, 49, 189; 364/421; 181/107; 73/662

[56] References Cited

U.S. PATENT DOCUMENTS

| | | | |
|---|---|---|---|
| 3,440,599 | 4/1969 | Waters et al. | 367/189 |
| 3,460,648 | 8/1969 | Brown et al. | 367/189 |
| 3,739,870 | 6/1973 | Pelton et al. | 367/189 |
| 3,886,493 | 5/1975 | Fair | 367/189 |
| 4,168,485 | 9/1979 | Payton et al. | 367/189 |

Primary Examiner—Nelson Moskowitz
Attorney, Agent, or Firm—William J. Miller

[57] ABSTRACT

A method and apparatus for construction of a seismic vibrator control signal which comprises manually selecting sweep parameter data values for starting frequency, ending frequency, sweep time and taper time and inputting to an addressable storage medium. Thereafter, determining for each of a plurality of sample points throughout the sweep time, the sweep rate of change per sample point and the accumulated frequency value per sample point, and outputting in real time the digital sweep values for each successive sample point, and subsequently converting and smoothing said successive digital sweep values to an analog control signal of the selected frequency, relative amplitude and duration of sweep length.

12 Claims, 5 Drawing Figures

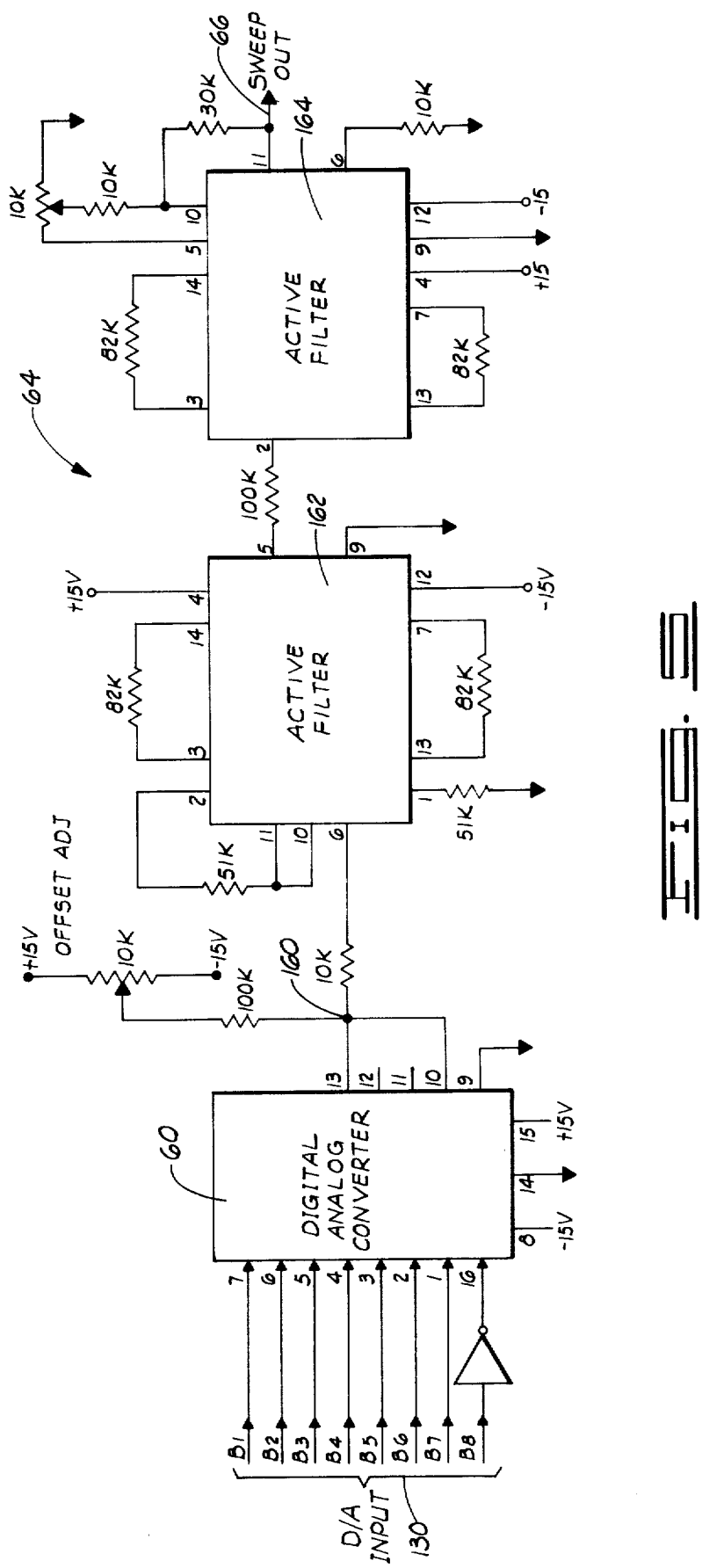

SEISMIC VIBRATOR CONTROL SYSTEM

BACKGROUND OF THE INVENTION

1. Field of the Invention

The invention relates generally to control signal generators and, more particularly, but not by way of limitation, it relates to a digital signal generator for use in controlling a seismic vibrator.

2. Description of the Prior Art

The prior art includes various forms of analog signal generator which have been utilized in controlling frequency, duration and amplitude of seismic vibrators. In general, the prior equipment has taken the form of analog generation devices for generating the prescribed replica or control signal. Such prior types of generator have not been capable of providing the frequencies necessary to resolve thin layering in geologic events, nor have they been able to provide the requisite sweep linearity to minimize ghosting or correlation background. One known prior teaching that is directed to digital construction of a prescribed control signal is the subject of U.S. Pat. No. 3,460,648 in the name of Waters et al. This patent describes a digital system for providing accurate sweep signals, but it has proven impractical due to the very large drum requirements when utilizing such computational digital equipment.

SUMMARY OF THE INVENTION

The present invention relates to a sweep generation system utilizing digital microprocessor technology that achieves the sweep parameters necessary to meet the requirements of not only the commonly used sweep spectrums, but also the requirements for the high-resolution seismic surveying now being practiced.

The sweep generation system consists of a microprocessor including program memory and random access memory which functions under a real-time interval timer to construct a desired seismic vibrator control signal in accordance with manually input parameters. Input parameters are initially input to the system by thumb wheel switches to select such as starting frequency, ending frequency, sweep time and taper time, and the central processing unit of the microprocessor orders the incrementing of output sweep values through a digital to analog converter and smoothing filter to the seismic vibrator system. Control output from the microprocessor through an external device control logic also allows selected transmit control logic as well as a pseudo-random code output for synchronization of more than a single seismic vibrator.

Therefore, it is an object of the present invention to provide a seismic vibrator control signal generator capable of increased frequency range and having starting and ending frequencies that are selectable in 1 hertz increments.

It is also an object of the present invention to provide a vibrator control signal that is capable of producing sweep lengths of greater duration and sweep taper times of greater length.

It is a further object of the present invention to provide a control signal generator for a seismic vibrator which enables a great reduction in correlation background in the measurable frequency ranges.

Finally, it is an object of the present invention to provide a control signal generator which is also capable of encoding and transmitting a pseudo-random code that can be decoded at selected sites for activating one or more sweep vibrators.

Other objects and advantages of the invention will be evident from the following detailed description when read in conjunction with the accompanying drawing which illustrate the invention.

BRIEF DESCRIPTION OF THE DRAWINGS

FIG. 5 is a schematic diagram of the sweep output stages of the present invention.

DETAILED DESCRIPTION OF THE INVENTION

Figure 1:
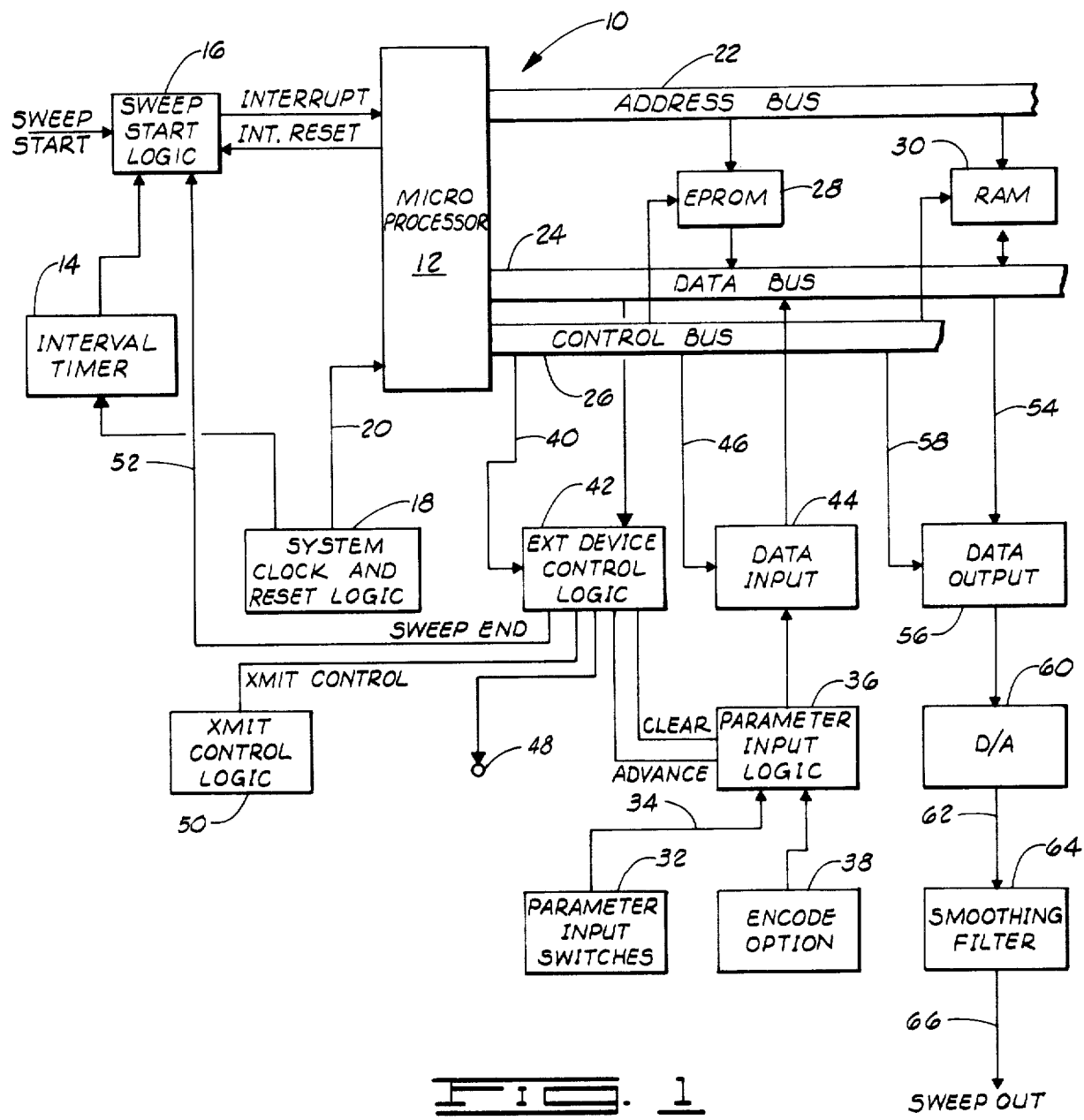
FIG. 1 is a system block diagram of the control signal generator.

The central control of the present system is a microprocessor which of necessity utilizes relatively slower processor speeds; therefore, the system utilizes an algorithm allowing for realtime output of the control signal sweep as it is developed. The particular algorithm as based on the classical vibrational sweep generation formula is:

$$\theta_{rad} = 2\pi \left[ f_1 + \frac{f_2 - f_1}{2T} n\Delta t \right] n\Delta t \tag{1}$$

where, $f_1$ = starting frequency
$f_2$ = ending frequency
$\Delta t$ = sample time increment
$T$ = total sweep time
$n$ = number of current sample.

Letting K represent accumulated frequency for any sample point, the accumulated frequency will then be equal to the starting frequency plus the sum of the rate of change per unit time from sample $n=0$ to the current sample. As, $$K = f_1 + \sum_{o}^{n} DF \tag{2}$$

where, $$DF = \frac{f_2 - f_1}{T}, \tag{3}$$

rate of change per unit time.

If DF equals the change in frequency per unit time and K is the accumulated frequency at a given sample, the next sample will be $$K_i = K_{i-1} + DF \tag{4}$$

In order to determine the amplitude of a sample, a table of values corresponding to $\pi$ radians or one-half cycle of a sine function is first calculated. These values are then spaced at 256 equal increments along the half cycle. The accumulated frequency K which is in radians is represented somewhere in the table of values by a corresponding amplitude. Thus, the correct amplitude can be located in the table by setting J as a number that starts at zero and accumulates the amount of phase advanced from sample to sample. Since the table of values is also disposed in equal radian increments, J will also be the address of the desired amplitude value. Therefore, incrementing of J will adhere to $$J_0 = 0,$$

$$J_i = J_{i-1} + K_i \quad (5)$$

Since the table is only $\pi$ radians in length and J is an eight-bit binary number representing 256 addresses, a means of determining when $\pi$ radians (a polarity sign change) has been exceeded in necessary. Thus, as the new K is summed into J, an overflow will occur when $\pi$ radians have been reached, and the sum of this overflow will be an indicator of sine; even numbers will signify a positive polarity and odd numbers will signify a negative polarity requiring the complement of the table value.

The taper function utilized in this particular algorithm is linear, although non-linear sweeps and/or non-linear tapers can be generated with minor changes to the program, if desired. As described herein, the taper rate of change per sample point, i.e., $\Delta T$, is a binary fraction which is the reciprocal of the taper length TL in seconds times the number of samples per second, NSPS. The taper factor TF is then a binary fraction which is a summation of successive $\Delta T$ values as shown below.

$$\Delta T = \frac{1}{TL \cdot NSPS} \quad (6)$$

$$TF_0 = 0, \text{ sweep start, and} \quad (7)$$

$$TF_i = TF_{i-1} + \Delta T, \text{ beginning taper} \quad (8)$$

The taper factor TF is applied to all sweep values in succession until the taper lenth has been reached. At this point, TF is maximum allowing full amplitude values to be output. When time is reached for the end taper, the reverse takes place and the $\Delta T$ values are subtracted as shown below.

$$TF_i = TF_{i-1} - \Delta T, \text{ end taper,} \quad (9) \text{ and}$$

$$TF_n = 0, \text{ sweep end} \quad (10)$$

The number of sweep values is determined by multiplying the sweep length by 2048. The number 2048 is the number of samples per second and is fixed at this value because it is the minimum number of samples to adequately describe a desirable upper frequency limit of 500 hertz; however, a higher sampling rate may be used thereby to extend the upper frequency limit. The number of sweep values to be effected by the taper factor is also determined by multiplying the taper time by 2048. Implementation of the algorithm is made by the use of integer arithmetic rather than floating point arithmetic in order to achieve minimum calculation, and all input values, counters, and the parameters K, DF, J, TF are represented as integers.

FIG. 1 shows the total system block digram, the specific portions of the system shown in FIGS. 2-5 to be discussed in addition. The sweep generation system 10 consists of a microprocessor 12 and peripheral elements. Microprocessor 12 functions under control of interval timer 14 and sweep-start logic 16 as basic clock frequency is input from system clock and reset logic 18 via lead 20. Data access from microprocessor 12 is carried out through address bus 22, data bus 24, and control bus 26. The microprocessor 12 is constituted of chip circuitry, Intel 8080A, to be further described, and the requisite program, amplitude table and pseudo-random code was converted to the Intel Microprocessor Language and burned into erasable program read only memory (EPROM) modules 28. Once programmed, the EPROM modules 28 cannot be changed without erasing and totally reprogramming the system. A selected amount of random access memory 30 (RAM) is included for use as scratchpad storage for parameters, sweep length counter, and taper length counters. Both memory modules, EPROM 28 and RAM 30, are controlled and addressed by the microprocessor 12 over address bus 22 and control bus 24. Input and output logic is also controlled by microprocessor 12 so that any data input or output is synchronized with the basic microprocessor timing.

Parameter input switches 32, decimal thumb wheel switches, provide selected binary coded decimal inputs of the sweep parameters, i.e., $f_1$, $f_2$, sweep time and taper time, via line 34 to parameter input logic 36. An encode switch 38 is also available if the desired operation is to transmit the pseudo-random code prior to outputting the sweep. The external device control logic 42 directed by the data bus 24 and controlled by the control bus 40 provides CLEAR and ADVANCE inputs to the parameter input logic 36 to correctly enter the parameter switch values through data input 44 to data bus 24. The external device control logic 42 also provides an output enabling the transmitter control logic 50 so the pseudo-random code can be transmitted while a SWEEP END output on line 52 is returned to sweep start logic 16.

Final data output is available from data bus 24 via line 54 to data output 56 under control of control bus line 58. Output from data output in stage 56 is then applied to a digital to analog converter 50 and the final analog signal on lead 62 is applied through a smoothing filter 64 for output as control signal on the SWEEP OUT line 66.

Figure 2:
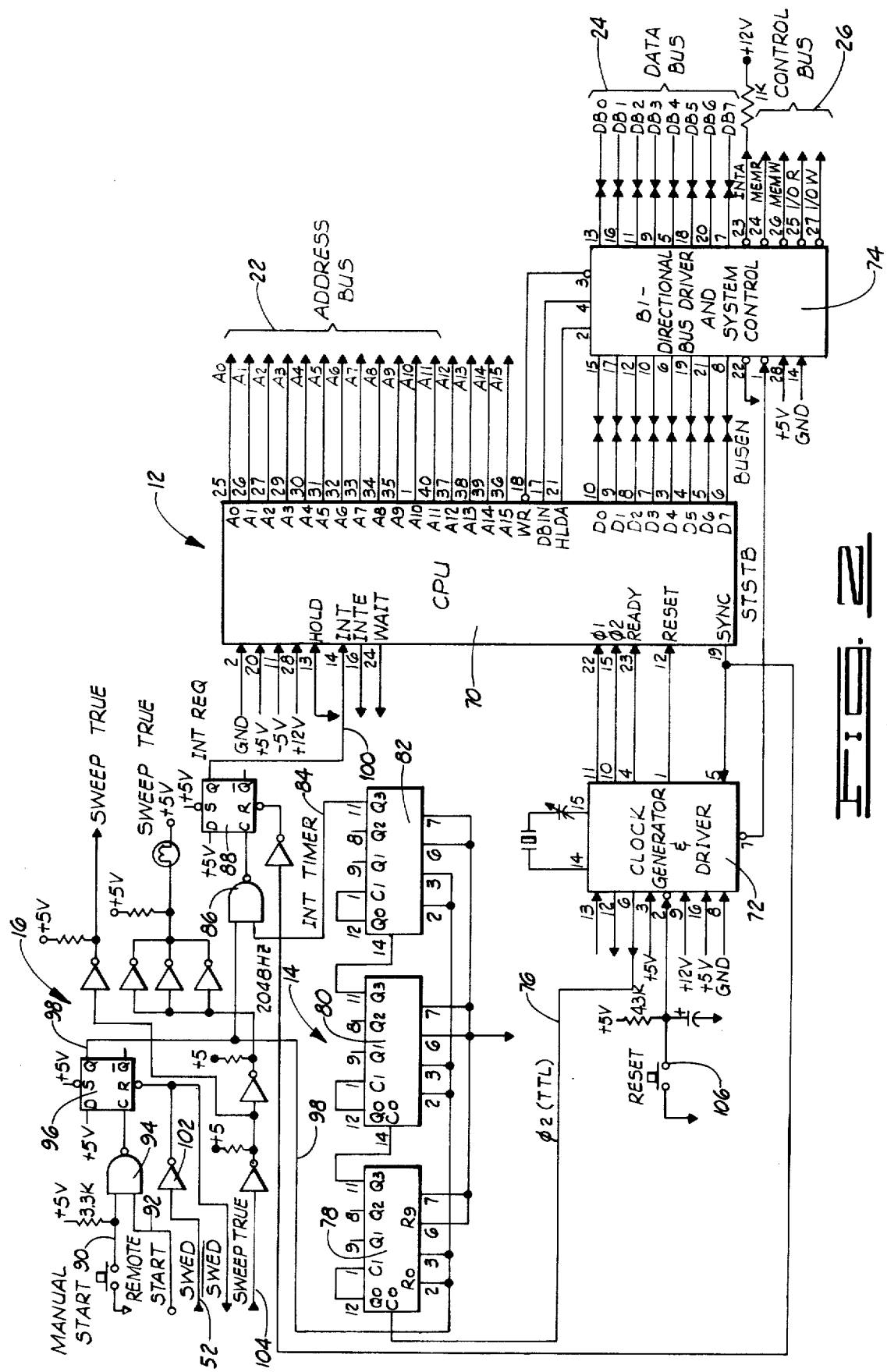
FIG. 2 is a schematic diagram of the sweep start logic and central processing unit of the present invention.

FIG. 2 illustrates in greater detail the microprocessor 12 and attendant bus interconnections along with interval timer 14 and the sweep start logic 16. The microprocessor 12 is of the Intel type utilizing a type 8080A central processing unit 70 in connection with a type 8224 clock generator and driver 72 and a type 8228 bi-directional bus driver and system control 74. The clock generator and driver 72 provide basic system timing as output on line 76, i.e., 2.048 mgHz, and as input to interval timer 14. The interval timer 14 consists of series divider circuits 78, 80, and 82, each type 7490, which provide the basic interval timing pulse output on line 84 at 2048 Hz. The timing signal on lead 84 is then applied to input of gate 86 for input to a flip-flop 88, IC type 7474, when the gate is enabled.

Start up of the system is effected either through manual start 90 or remote start 92 through gate 94 as input to a first flip-flop 96, type 7474. Flip-flop 96 then provides output via line 98 enabling gate 86 to pass interval timer pulses to actuate the second flip-flop 88 thereby to provide interrupt pulse output on line 100 to the central processing unit 70. The first flip-flop 96 output on the gate lead 98 is also applied to each of the divider circuits 78, 80 and 82. A SWEEP END input on line 52 is applied through an inverter 102 to first flip-flop 96, such SWED signal being derived from the external device control logic 42. SWEEP TRUE signal as derived from external device control logic 42 is also applied on line 104 through an inverter network to provide SWEEP TRUE validity signal indication. RESET of the system is effected by means of a grounded push-button switch 106 in control of clock generator and driver 72 which provides reset of the control inputs to the central processing unit 70.

Figure 3:
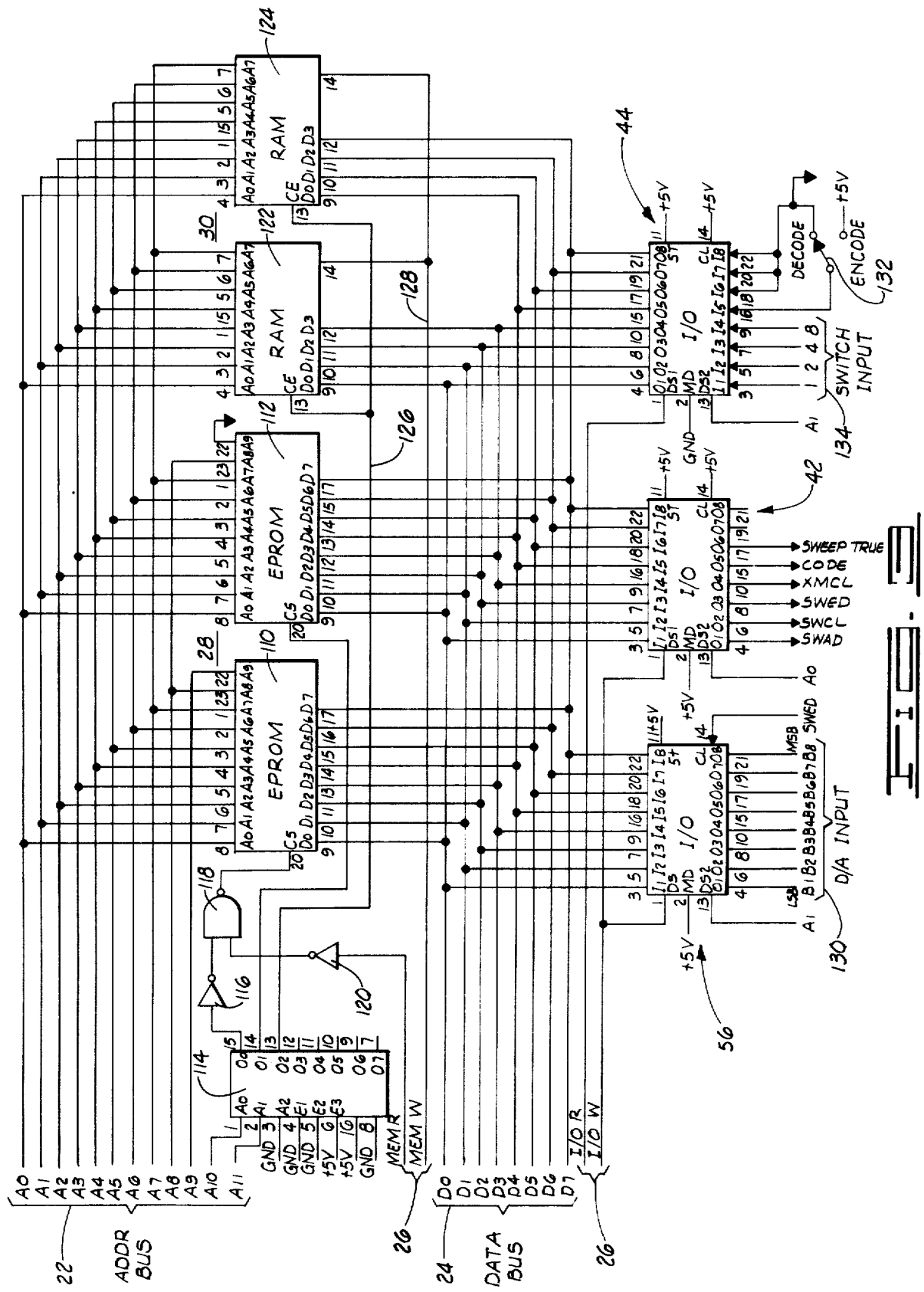
FIG. 3 is a schematic diagram of the read only memory and random access memory in bus interconnection with the input/output stages of the present invention.

FIG. 3 illustrates in greater detail the memory and input/output stages of signal generator system 10. Thus, the erasable programmable read only memory 28 includes two eproms 110 and 112 as connected in parallel to address bus 22 and data bus 24. The eprom 110 is a type 8708 while eprom 112 is a type 8704, each receiving supply voltage at pins 24, 19 and 21 with pins 2 and 18 at ground. Chip select input at pin 20 of eprom 110 is controlled by the output of NAND gate 118. The output of NAND 118 is determined by the two inputs; one of which is provided from the address bus 22 through a type 8205 8-to-1 decoder 114 and inverter 120 while the second is provided by the control bus 26 through inverter 120. Chip select input for eprom 112 is then controlled by the address bus 22 through the 8-to-1 decoder 114.

The random access memory 30 consists of RAM chips 122 and 124, each type 2112-2, as connected in parallel between address bus 22 and data bus 24. Chip enable input via line 126 is obtained from address bus 22 through 8-to-1 decoder 114, and memory write enable from control bus 26 is applied via line 128 to each of RAMS 122 and 124. Each of RAMS 122 and 124 is energized by +5 volt supply at pin 16 with pin 8 grounded.

Data output stage 56 is a type 8212 input/output stage consisting of an 8-bit latch with tri-state output buffers. Thus, input from data bus 24 is strobed out by data output 56 as 8-bit binary data B1-B8 to the digital/analog input 130 (FIG. 5) as will be further described. From control bus 26 I/O write signal is applied to the Device Select (DS1) input. $A_1$ of the address bus 22 is applied to DS2.

The external device control logic 42 is also a type 8212 input/output stage and it is connected similar to the data output stage 56 with DSI input being connected to I/O write of the control bus 22 and $A_0$ of the address bus 22 applied to DS2. Binary input to the input/output stage 42 is then output as specific command pulses for SWEEP TRUE, SWEEP END, TRANSMITTER CONTROL, SWITCH CLEAR and SWITCH ADVANCE. The pseudo-random code is also output from this stage.

The data input stage 44 is made up of a third type 8212 input/output stage having binary connection to data bus 24 with input from encode switch 132 as well as binary coded decimal input 134 from parameter input switches 32 (FIG. 4), as will be further described. The input/output stage or data input 44 is connected with the Device Select 1 input connected to the control bus 26 I/O READ line, and the Device Select 2 input is connected to the $A_1$ line of address bus 22 and central processing unit 70.

Figure 4:
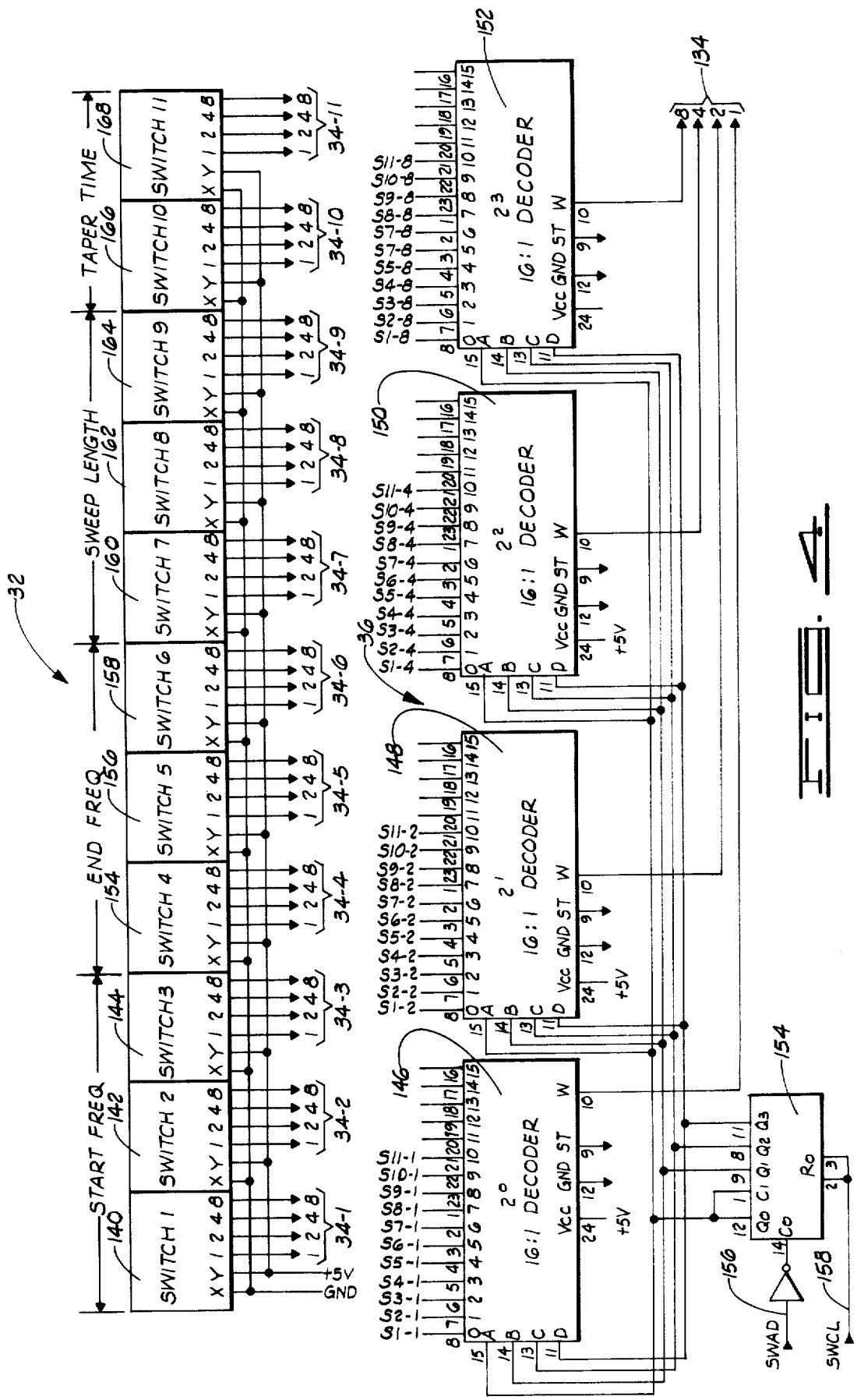
FIG. 4 is a schematic diagram of the parameter input logic of the present invention.

FIG. 4 illustrates the parameter input switches 32 and parameter input logic 36 in greater detail. The parameter input switches 32 consist of eleven decimal thumb wheel switches that are coded so that a decimal number input is converted into a binary coded decimal output to the parameter input logic 36. Thus, the START frequency $f_1$ is dialed in three digits by decimal/BCD switches 140, 142 and 144 and the respective BCD output is input to a respective one of the 16-to-1 decoders, i.e., the $2^0$ decoder 146, $2^1$ decoder 148, $2^2$ decoder 150 and $2^3$ decoder 152. The BCD outputs from the respective switches 140-144 is via lead groups 34-1, 34-2, and 34-3, with each of the respective leads of the lead group applied to a respective input of the decoders 146-152 as designated. That is, the 1 output of lead group 34-1 is applied to the S1-1 input or pin 0 of decoder 146, the 2 output of lead group 34-1 is applied to the S1-2 input or pin 0 of decoder 148, etc.

In like manner, all of the switch inputs are applied in four conductor BCD form to the respective decoders 146-152. The END frequency or $f_2$ is dialed for input in three decimal digits by thumb wheel switches, 154, 156 and 158 as the BCD outputs on lead groups 34-4, 34-5 and 34-6 are applied to the respective decoders 146-152. The SWEEP LENGTH is dialed in by thumb wheel switches 160, 162 and 164 with BCD output on lead groups 34-7, 34-8 and 34-9; and the TAPER TIME, a two digit number, is dialed in by selection of switches 166 and 168 with BCD output on respective lead groups 34-10 and 34-11. All binary coded switch inputs from lead groups 34-1 through 34-11 are applied to the respective binary decoders 146-152 as designated. The 16-to-1 decoders 146-152 are each IC Type 74150.

The decoders 146-152 are each controlled in sequence by a Binary Counter integrated circuit 154, IC Type 7493, in response to switch ADVANCE input on lead 156 and switch CLEAR input on lead 158. The switch ADVANCE and CLEAR inputs are conducted from the external device control logic 42 (FIGS. 1 and 3). BCD output from the decoders 146-152 is then derived from the pin 10 connection to constitute lead group 134 as applied to switch input terminals of the data input circuit 44 (FIG. 3).

The output from data output 56 (FIG. 3) is in the form of eight-bit binary, i.e., lead B1-B8 or input group 130 of FIG. 5. The binary input of lead group 130 is then applied to a digital to analog converter 60, a Burr-Brown Type DAC 90 with output present at junction 160. The converter output at junction 160 is then applied through smoothing filters 64 which consist of series active filters 162 and 164. Each of the active filters is a National Type AF 100-2CJ op-amp filter, and sweep output is available on lead 66 for application in energization of the particular vibrator system.

In operation, when power is turned on or the system reset is initiated the microprocessor 12 is reset back to the starting address. At this time the sweep start logic 16 is reset with a SWEEP END pulse on line 52. Next the sweep parameters $f_1$, $f_2$, sweep time and taper time (see FIG. 4) are scanned and input to the system as the decimal thumb wheel switches 140-168 provide their input through decoders 146-152 enabled by binary counter 154 for input on BCD lines 134. Each parameter is determined by setting the correct number into thumb wheel switches 140-168 and they are coded so that the decimal number is converted to a BCD output thereby reducing the number of output lines which must be applied to the $2^0$-$2^3$ decoders 146-152. The four-bit binary counter 154 then programs the decoders 146-152 to output the desired switch input as it is applied on input lines 134 to data input 44 (FIGS. 1 and 3). The counter 154 is reset and advanced by command of the microprocessor 12 through external control logic 42, i.e., flip-flops and output buffers (FIG. 3), and the decoder outputs 134 are then applied through input-/output device 44 for gating onto data bus 24.

Thus, the data input 44 (FIG. 3) samples each switch 140–144 for $f_1$ in sequence, and the binary coded decimal values are buffered from the flip-flops onto the data bus 24 and then converted to a binary number and stored in RAM memory 30 (FIG. 1) until needed to calculate the parameter constants. In turn, the data input logic 44 samples the switches of $f_2$ (end frequency switches 154–158), sweep length or switches 160–164, and taper time switches 166 and 168.

With input of the operating parameters, the microprocessor 12 and associated memory circuitry undertakes to determine the sweep direction up or down, and the sweep rate DF is calculated. With input of the starting frequency $f_1$ and the calculated DF, the initial value of K is then calculated. J is then set equal to 0 and the taper factor is determined. Thereafter, the sweep length T is multiplied by the number of samples per second, i.e., 2048, to determine the total number of samples, and the taper time is also multiplied by 2048 to determine the number of values needed for the taper function at the start and end of the sweep. From these determined values, three counters are set to memorize beginning taper, end taper, and remaining sweep time. When all constants have been calculated and counter set, the processor goes into a halt state awaiting a sweep start signal to initiate the output of the sweep.

Referring to FIG. 2, when a sweep start pulse, either manual or remote, is received by the gate 94 of the start logic, a flip-flop 96 is set. This setting enables gate 86 to pass pulses from the interval timer 14 on lead 84 thereby to set flip-flop 88 which provides interrupt pulse to the central processing unit 70 of microprocessor 12. When the CPU 70 has recognized the interrupt, it resets flip-flop 88 to allow the next timer pulse to interrupt at the correct time interval. The interval timer 14 is controlled by a high frequency crystal and counted down to the desired frequency of 2048 Hertz by the divider circuit 78–82.

When the first interrupt occurs, the microprocessor 12 moves from its halt state and checks the status of the encode switch 132 (see FIG. 3). If the encode switch 132 is in encode position, the external transmitter is turned on and, after an appropriate delay, the pseudo-random code is output. The transmitter is then turned off. To allow the decoder at a remote site to recognize the code, another delay is taken before starting to output the first sweep value. After the first interrupt, the encode switch status is bypassed, and if the encode switch indication is false, the microprocessor 12 moves from its halt state and immediately begins to output a sweep value. The taper factor is applied to the sweep value addressed by the number J. This value is output through the output logic 56 as D/A input 130 to a digital-to-analog converter 60 (FIG. 5).

The output from D/A converter 60 is then applied from output junction 160 to a smooth filter or op-amp filter 162 to remove the voltage steps. Next, the appropriate counter of microprocessor 12 is decremented by one count and, (a) a new taper factor is formed by summing ΔT into the TF constant, (b) a new table address is formed by adding the previous J with K. K is then updated for the next value by adding K with DF. With the constants updated, the microprocessor 12 halts to wait for the next interval timer pulse, and this procedure is repeated 2048 times a second until all counters are decremented to 0. At this time, the flip-flop 96 (FIG. 2) is reset with a sweep end signal on lead 52 thereby disabling the interval timer 14 output. The microprocessor 12 is then reset to the starting address where it resamples all input parameters, recalculates all constants and counters, halts and waits for its next operating start.

As an example, one form of program that is suitable for carrying out the present invention may be programmed in standard Intel microprocessor language, as follows.

```
ASSEMBLY              SOURCE
CODE                  CODE            COMMENTS

0000                  ORG    0097H

INITALIZE THE CALCULATION CONSTANTS 0097  3E04    START:  MVI    A,4
0099  D301            OUT    1         SWEEP END
009B  31FF08          LXI    SP,08FFH    STACK POINTER
009E  211308          LXI    H,0813H
00A1  0620            MVI    B,32        CONSTANT BYTE COUNT
00A3  AF              XRA    A           ZERO ACCUM
00A4  77              MOV    M,A         ZERO CONSTANT LOC
00A5  23              INX    H
00A6  05              DCR    B
00A7  CAAD00          JZ     $+6         CONSTANTS ZEROED
00AA  C3A400          JMP    $-6
00AD  218000          LXI    H,128       INIT J
00B0  220D08          SHLD   J
00B3  3E02            MVI    A,2         INIT CNT FLAG
00B5  320F08          STA    CNFL
00B8  3E03            MVI    A,3         INIT CNT1
00BA  321008          STA    CNT1
00BD  3E04            MVI    A,4         INIT CNT2
```

```
00BF 321108          STA   CNT2
0002 3E02            MVI   A,2           INIT CNT3
0004 321208          STA   CNT3
0007 3EFF            MVI   A,0FFH        INIT CDT
0009 322108          STA   CDT+2
```

INPUT SWEEP PARAMETERS

```
0000 3E02            MVI   A,2
000E D301            OUT   1             RESET TO INPUT MUX
00D0 AF              XRA   A
00D1 D301            OUT   1
00D3 0E03            MVI   C,3           FS DIGIT COUNTER
00D5 CD2604          CALL  BCD           BCD TO BIN CONV
00D8 220008          SHLD  FS            STORE FS
00DB 0E03            MVI   C,3           FE DIGIT COUNTER
00DD CD2604          CALL  BCD
00E0 220208          SHLD  FE            STORE FE
00E3 0E03            MVI   C,3           SL DIGIT COUNTER
00E5 CD2604          CALL  BCD
00E8 220408          SHLD  SL            STORE SL
00EB 0E02            MVI   C,2           TL DIGIT COUNTER
00ED CD2604          CALL  BCD
00F0 7D              MOV   A,L
00F1 320608          STA   TL            STORE TL
```

SHIFT FS TO CORRECT BINARY POINT AND STORE IN F

```
00F4 2A0008          LHLD  FS            FS IN H AND L REG
00F7 0606            MVI   B,6           SHIFT COUNTER
00F9 CD5404          CALL  SHFTL         SHIFT LEFT ROUTINE
00FC 7D              MOV   A,L
00FD E6C0            ANI   0C0H          ZERO LAST 6 BITS
00FF 321508          STA   F+2
0102 7C              MOV   A,H
0103 321608          STA   F+3           FS NOW SHIFTED
```

COMPARE FS & FE. DETERMINE RATE SIGN.
STORE LARGER IN DF

```
0106 010108          LXI   B,FS+1        ADDR OF MSBYTE FS
0109 210308          LXI   H,FE+1        ADDR OF MSBYTE FE
010C 0A              LDAX  B             MSBYTE FS IN ACCUM
010D BE              CMP   M             COMPARE
010E C21501          JNZ   CKCY          NOT EQUAL, CHECK CARRY
0111 0B              DCX   B             EQUAL, GET LSBYTES
0112 2B              DCX   H             OF FS AND FE
0113 0A              LDAX  B             LSBYTE FS IN ACCUM
0114 BE              CMP   M             COMPARE
0115 DA2C01  CKCY:   JC    UPSW          FE GREATER, UPSWEEP
0118 3E01            MVI   A,1           FS GREATER, DOWN SWEEP
011A 321B08          STA   UDFL          STORE UP DOWN SWEEP FLAG
011D 2A0208          LHLD  FE
0120 220708          SHLD  F1            FE STORED IN F1
0123 2A0008          LHLD  FS
0126 221808          SHLD  DF+1          FS STORED IN DF
0129 C33801          JMP   MSUB          SUBTRACT FE FROM FS
012C 2A0008  UPSW:   LHLD  FS
012F 220708          SHLD  F1            FS STORED IN F1
0132 2A0208          LHLD  FE
0135 221808          SHLD  DF+1          FE STORED IN DF
```

CALC DFC = (F2-F1)*2**22. SUBTRACT AND SHIFT LEFT

```
0138 1E02    MSUB:  MVI   E,2         BYTE COUNTER
013A 011808         LXI   B,DF+1      ADDR OF F2
013D 210708         LXI   H,F1        ADDR OF F1
0140 AF             XRA   A           CLEAR CARRY BIT
0141 0A      SUBT:  LDAX  B           BYTE OF F2
0142 9E             SBB   M           SUBRACT BYTE OF F1
0143 02             STAX  B           STORE RESULT AT DF
0144 1D             DCR   E           DECREMENT COUNT
0145 CA4D01         JZ    $+8         DONE IF E=0
0148 03             INX   B           ADDR NEXT BYTE OF F2 & F1
0149 23             INX   H
014A C34101         JMP   SUBT        SUBTRACT NEXT TWO BYTES
014D 2A1808         LHLD  DF+1        F2-F1 IN H AND L
0150 0603           MVI   B,3         SHIFT COUNTER
0152 CD5404         CALL  SHFTL       SHIFT LEFT ROUTINE
0155 7D             MOV   A,L         LSBYTE
0156 E6F8           ANI   0F8H        ZERO LAST 3 BITS
0158 321808         STA   DF+1        2ND BYTE OF DF STORED
015B 7C             MOV   A,H         MSBYTE
015C 321908         STA   DF+2        3RD BYTE OF DF STORED
```

DIVIDING DFC BY SL

```
015F 211908         LXI   H,DF+2      BYTE ADDR OF DFC
0162 4E             MOV   C,M         BYTE IN C REG
0163 3A0408         LDA   SL          SL IN ACCUM
0166 57             MOV   D,A         SL IN D REG
0167 CD5F04   CLDF: CALL  DIV         DIVIDE ROUTINE
016A 3A1008         LDA   CNT1        FETCH CNT
016D 3D             DCR   A           DECREMENT COUNT
016E CA7901         JZ    COMP        COMPLETE IF COUNT=0
0171 321008         STA   CNT1        RESTORE UPDATED CNT
0174 2B             DCX   H           NEXT BYTE ADDR
0175 4E             MOV   C,M         NEXT BYTE IN C REG
0176 C36701         JMP   CLDF        DIVIDE NEXT BYTE
```

CALC DF/2 BY 1 SHIFT TO RIGHT AND STORE
IN K

```
0179 011A08   COMP: LXI   B,DF+3      BYTE ADDR OF DF
017C 110C08         LXI   D,K+3       STORAGE ADDR IN K
017F AF             XRA   B           CLEAR CARRY
0180 0A      SHFTR: LDAX  B           BYTE OF DF
0181 1F             RAR               ROTATE TO RIGHT
0182 12             STAX  D           STORE BYTE IN K
0183 3A1108         LDA   CNT2        SHIFT CNT
0186 3D             DCR   A
0187 CA9201         JZ    CHEK        CNT2=0 SHIFT COMPLETE
018A 321108         STA   CNT2        CNT2 NOT 0 CONTINUE
018D 0B             DCX   B           NEXT BYTE DF
018E 1B             DCX   D           NEXT ADDR OF K
018F C38001         JMP   SHFTR       NEXT SHIFT OPER
```

CHECK UP OR DOWN SWEEP FLAG AND
COMPLEMENT DF & K IF FLAG=1

```
0192 3A1B08   CHEK: LDA   UDFL        FETCH UP DOWN FLAG
0195 1F             RAR               ROTATE TO GE LSB IN CY
0196 D2BB01         JNC   MADD        CARRY NO COMPL
0199 0604           MVI   B,4         BYTE CNT
019B 111708         LXI   D,DF        ADDR OF BYTE TO COMPL
019E 2600           MVI   H,0         ZERO H REG
```

```
01A0 37              STC           SET CARRY FOR 2'S COMPL
01A1 1A       DFCM:  LDAX  D       BYTE TO COMPL
01A2 2F              CMA           COMPL BYTE
01A3 8C              ADC   H       ADD H TO ACCUM WITH CARRY
01A4 12              STAX  D       STORE BACK
01A5 13              INX   D       NEXT BYTE
01A6 05              DCR   B       DECREMENT COUNT
01A7 C2A101          JNZ   DFCM    B NOT ZERO GET NEXT BYTE
01AA 0604            MVI   B,4     BYTE CNT
01AC 110908          LXI   D,K     ADDR OF BYTE TO COMPL
01AF 2600            MVI   H,0     ZERO H
01B1 37              STC           SET CARRY FOR 2'S COMPL
01B2 1A       KCM:   LDAX  D       BYTE TO COMPL
01B3 2F              CMA           COMPL
01B4 8C              ADC   H       ADD H TO ACCUM WITH CARRY
01B5 12              STAX  D       STORE BACK
01B6 13              INX   D       NEXT BYTE ADDR
01B7 05              DCR   B       DECREMENT CNT
01B8 C2B201          JNZ   KCM     NOT ZERO, GET NEXT BYTE
```

ADD F AND DF/2 AND STORE IN K

```
01BB 1E04     MADD:  MVI   E,4     BYTE COUNT
01BD 010908          LXI   B,K     BYTE ADDR OF K
01C0 211308          LXI   H,F     BYTE ADDR OF F
01C3 AF              XRA   A       CLEAR CARRY BIT
01C4 0A       ADLP:  LDAX  B       BYTE OF DF/2
01C5 8E              ADC   M       ADD BYTE OF F WITH CARRY
01C6 02              STAX  B       STORE RESULT IN K
01C7 1D              DCR   E       DECREMENT BYTE CNT
01C8 CAD001          JZ    CADT    E=0 ADD COMPLETE
01CB 03              INX   B       NEXT BYTE OF DF/2
01CC 23              INX   H       NEXT BYTE OF F
01CD C3C401          JMP   ADLP    ADD NEXT TWO BYTES
```

CALC OF THE DELTA TAPER FACTOR (10*2**4)/TL

```
01D0 211D08   CADT:  LXI   H,DT+1  ADDR OF BYTE
01D3 0600            MVI   B,0     ZERO B REG
01D5 0E0B            MVI   C,0BH   ZERO SHIFT IN C
01D7 3A0608          LDA   TL      TAPER LENGTH IN ACCUM
01DA FE00            CPI   0       COMPARE TO ZERO
01DC CA6902          JZ    NOTP    IF ZERO NO TAPER
01DF 57              MOV   D,A     MOVE TO D REG
01E0 CD5F04   DLTP:  CALL  DIV     DIVIDE ROUTINE
01E3 3A1208          LDA   CNT3    DIV CNT
01E6 3D              DCR   A
01E7 CAF201          JZ    CLTF    A=0 FINISHED
01EA 321208          STA   CNT3    STORE UPDATED CNT
01ED 2B              DCX   H       NEXT BYTE ADDR
01EE 4E              MOV   C,M     NEXT BYTE IN C
01EF C3E001          JMP   DLTP    DIV NEXT BYTE
01F2 AF       CLTF:  XRA   A       CLEAR CARRY
01F3 2A1C08          LHLD  DT      LOAD DT
01F6 7D              MOV   A,L
01F7 2F              CMA           COMPLIMENT LSBYTE OF DT
01F8 C601            ADI   1       ADD ONE FOR 2'S COMPL
01FA 6F              MOV   L,A
01FB 7C              MOV   A,H
01FC 2F              CMA           COMPLIMENT MSBYTE OF DT
01FD CE00            ACI   0       ADD CARRY
01FF 67              MOV   H,A
0220 221F08          SHLD  CDT     STORE COMPLIMENTED DT
```

CALC TAPER COUNTERS

```
0203 3E02              MVI   A,2         DIV PASS CNT
0205 321208            STA   CNT3        UPDATED PASS CNT
0208 3A0608            LDA   TL          TAPER LENGTH
020B 6F                MOV   L,A         TL IN L REG
020C 2600              MVI   H,0         ZERO H REG
020E 0603              MVI   B,3         SHIFT COUNTER
0210 CD5404            CALL  SHFTL       SHIFT LEFT ROUTINE
0213 7D                MOV   A,L
0214 E6F8              ANI   0F8H        ZERO LAST THREE BITS
0216 4F                MOV   C,A         GETTING DIVIDEND
0217 44                MOV   B,H         READY FOR DIV ROUTINE
0218 212808            LXI   H,BTC+1     ADDR FOR RESULT
021B 160A              MVI   D,10        DIVISOR IN D
021D CD5F04    CABTC:  CALL  DIV         DIVIDE ROUTINE
0220 3A1208            LDA   CNT3        DIV CNT
0223 3D                DCR   A
0224 CA2F02            JZ    CLBTC       A=0
0227 321208            STA   CNT3        UPDATED COUNT
022A 2B                DCX   H           NEXT BYTE
022B 4E                MOV   C,M         GET NEXT BYTE
022C C31D02            JMP   CABTC       DIV NEXT BYTE
022F 2A2708    CLBTC:  LHLD  BTC         BEGIN TAPER CNT IN H & L
0232 0601              MVI   B,1         SHIFT CNT (DOUBLES BTC)
0234 CD5404            CALL  SHFTL       SHIFT LEFT ROUTINE
0237 AF                XRA   A           CLEAR CARRY
0238 7D                MOV   A,L
0239 E6FE              ANI   0FEH        ZERO LAST BIT
023B CE01              ACI   1           ADD 1 TO DTC
023D 6F                MOV   L,A
023E 7C                MOV   A,H
023F CE00              ACI   0           ADD CARRY
0241 67                MOV   H,A
0242 222508            SHLD  DTC         DTC+1 STORED FOR USE
0245 AF                XRA   A           CLEAR CARRY
0246 3A2708            LDA   BTC         LSBYTE OF BTC
0249 DE01              SBI   1           SUBTRACT 1 FROM BTC
024B 322708            STA   BTC         RESTORE
024E 3A2808            LDA   BTC+1       GET MSBYTE
0251 DE00              SBI   0           SUBTRACT CARRY
0253 322808            STA   BTC+1       RESTORE
0256 3A2708            LDA   BTC
0259 DE01              SBI   1           SUBTRACT 1 FROM BTC
025B 322F08            STA   ETC
025E 3A2808            LDA   BTC+1
0261 DE00              SBI   0           SUBTRACT CARRY
0263 323008            STA   ETC+1       ETC ONE LESS THAN BTC
0266 C37502            JMP   CASLC
0269 2E01     NOTP:    MVI   L,1         SET L TO 1
026B 2600              MVI   H,0         ZERO H
026D 222508            SHLD  DTC         DTC SET TO ONE
0270 3E7F              MVI   A,7FH
0272 322408            STA   TF+2        TAPER FACTOR SET TO 7F
```

CALC OF SLC (TOTAL SWEEP LENGTH - BTC + ETC)

```
0275 2A0408    CASLC:  LHLD  SL          SWEEP LENGTH IN H AND L
0278 0603              MVI   B,3         SHIFT CNT
027A CD5404            CALL  SHFTL       SHIFT LEFT ROUTINE
027D 7D                MOV   A,L
027E E6F8              ANI   0F8H        ZERO LAST THREE BITS
```

```
0280 6F              MOV   L,A           STORE RESULT
0281 222C08          SHLD  SLC+1         SUBTRACT BYTE CNT
0284 1E02            MVI   E,2           ADDR OF SLC
0286 012B08          LXI   B,SLC         ADDR OF DTC
0289 212508          LXI   H,DTC         CLEAR CARRY BIT
028C AF              XRA   A
028D 0A      TSUB:   LDAX  B             BYTE OF SLC
028E 9E              SBB   M             SUBTRACT BYTE OF DTC
028F 02              STAX  B             STORE RESULT AT SLC
0290 1D              DCR   E
0291 03              INX   B             NEXT BYTE SLC
0292 CA9902          JZ    LXBY          E=0
0295 23              INX   H             NEXT BYTE DTC
0296 C38D02          JMP   TSUB          SUBTRACT NEXT TWO BYTES
0299 0A      LSBY:   LDAX  B             BYTE OF SLC
029A 2600            MVI   H,0           ZERO H
029C 9C              SBB   H             SUBTRACT CARRY FROM SLC
029D 02              STAX  B             STORE RESULT
029E 012C08          LXI   B,SLC+1       ZERO MSB OF SECOND BYTE
02A1 0A              LDAX  B             SO THE DOUBLE WORD COUNTER
02A2 17              RAL                 WORKS CORRECTLY
02A3 03              INX   B
02A4 0A              LDAX  B
02A5 17              RAL
02A6 02              STAX  B
02A7 03              INX   B
02A8 0A              LDAX  B
02A9 17              RAL
02AA 02              STAX  B
02AB 3A2C08          LDA   SLC+1
02AE E67F            ANI   7FH
02B0 322C08          STA   SLC+1
02B3 2A3108          LHLD  ETC+2         GET TAPER COUNTER
02B6 E5              PUSH  H             AND SWEEP COUNTER
02B7 2A2F08          LHLD  ETC           IN STACK
02BA E5              PUSH  H
02BB 2A2D08          LHLD  SLC+2
02BE E5              PUSH  H
02BF 2A2B08          LHLD  SLC
02C2 E5              PUSH  H
02C3 2A2908          LHLD  BTC+2
02C6 E5              PUSH  H
02C7 2A2708          LHLD  BTC
02CA E5              PUSH  H
```

CHECK ENCODE STATUS. IF FALSE
BYPASS CODE OUTPUT. IF TRUE
START DELAY, OUTPUT CODE, AND
GIVE CORRELATION DELAY.

```
02CB DB02            IN    2             INPUT ENCODE STATUS
02CD E6F0            ANI   0F0H          ZERO UPPER BITS
02CF FE10            CPI   10H           COMPARE FOR ENCODE BIT
02D1 C22003          JNZ   TRUE          ENCODE FALSE
02D4 012204          LXI   B,1058        529 MS DELAY
02D7 FB      DELAY:  EI                  INTERRUPT ENABLE
02D8 76              HLT
02D9 0B              DCX   B
02DA 78              MOV   A,B
02DB 17              RAL                 MSB TO CARRY
02DC DAE202          JC    $+6           DELAY COMPLETE
02DF C3D702          JMP   DELAY
```

```
02E2 3E08              MVI   A,8
02E4 D301              OUT   1          TURN ON TRANSMITTER
02E6 011703            LXI   B,791      396 MS DELAY
02E9 FB      TXON:     EI               INTERRUPT ENABLE
02EA 76                HLT
02EB 0B                DCX   B
02EC 78                MOV   A,B
02ED 17                RAL              MSB TO CARRY
02EE DAF402            JC    $+6        DELAY COMPLETE
02F1 C3E902            JMP   TXON
02F4 218004            LXI   H,0480H    1ST CODE BIT ADDRESS
02F7 067F              MVI   B,127      NUMBER OF CODE BITS
02F9 164F    RELD:     MVI   D,79       BIT ON TIME
02FB 7E                MOV   A,M
02FC D301              OUT   1          OUTPUT CODE VALUE
02FE 23                INX   H          NEW CODE ADDRESS
02FF 05                DCR   B
0300 CA0A03            JZ    DONE       CODE ALL XMITTED
0303 15                DCR   D
0304 CAF902            JZ    RELD       NEXT CODE BIT
0307 C30303            JMP   $-4
030A 3E00    DONE:     MVI   A,0
030C D301              OUT   1          TURN OFF TRANSMITTER
030E 06C8              MVI   B,0C8H     CORRELATION DELAY 1
0310 0E32              MVI   C,32H      CORRELATION DELAY 2
0312 05                DCR   B
0313 CA1903            JZ    $+6        1ST DELAY COMPLETE
0316 C31203            JMP   $-4
0319 0D                DCR   C
031A CA2003            JZ    TRUE       DELAY COMPLETE
031D C31903            JMP   $-4
0320 01D007  TURE:     LXI   B,2000     AFTER DECODE DELAY
0323 FB      COMPL:    EI
0324 76                HLT
0325 0B                DCX   B
0326 78                MOV   A,B
0327 17                RAL              MSB TO CARRY
0328 DA2E03            JC    SWTR       DELAY COMPLETE
032B C32303            JMP   COMPL
032E 0612    SWTR:     MVI   B,18       10MS DELAY
0330 FB      WAIT:     EI
0331 76                HLT
0332 3E20              MVI   A,20H
0334 D301              OUT   1          SWEEP TRUE
0336 05                DCR   B
0337 CA3F03            JZ    SWEEP
033A 1600              MVI   D,0        ZERO COMPL FLAG
033C C33003            JMP   WAIT
```

FETCHING THE NEXT SWEEP VALUE FROM TABLE

```
033F 4A      SWEEP:    MOV   C,D        SHIFT COMPL FLAG
0340 1605              MVI   D,05       MSBYTE TABLE ADDRESS
0342 1A                LDAX  D          LOAD TABLE VALUE TO ACCUM
0343 51                MOV   D,C        RESTORE COMP FLAG
```

MULTIPLY TABLE VALUE WITH TAPER FACTOR

```
0344 0600              MVI   B,0        INITIALIZE MSBYTE OF RESULT
0346 4F                MOV   C,A        MULTIPLIER (TABLE VALUE) IN C
0347 3A2408            LDA   TF+2       FETCH TAPER FACTOR
034A 6F                MOV   L,A        AND PUT IN L REG
```

| | | | | |
|---|---|---|---|---|
| 034B | 79 | MOV | A,C | ROTATE LS BIT OF |
| 034C | 1F | RAR | | MULTIPLIER TO CARRY AND SHIFT |
| 034D | 4F | MOV | C,A | LOW ORDER BYTE OF RESULT |
| 034E | 78 | MOV | A,B | |
| 034F | D25303 | JNC | $+4 | JUMP TO ROTATE IF CARRY = 0 |
| 0352 | 85 | ADD | L | ADD MULTIPLICANT TO HIGH ORDER BYTE IF CARRY WAS SET |
| 0353 | 1F | RAR | | CARRY = 0, SHIFT HIGH ORDER BYTE |
| 0354 | 47 | MOV | B,A | |
| 0355 | 79 | MOV | A,C | REPEAT |
| 0356 | 1F | RAR | | |
| 0357 | 4F | MOV | C,A | |
| 0358 | 78 | MOV | A,B | |
| 0359 | D25D03 | JNC | $+4 | |
| 035C | 85 | ADD | L | |
| 035D | 1F | RAR | | |
| 035E | 47 | MOV | B,A | |
| 035F | 79 | MOV | A,C | REPEAT |
| 0360 | 1F | RAR | | |
| 0361 | 4F | MOV | C,A | |
| 0362 | 78 | MOV | A,B | |
| 0363 | D26703 | JNC | $+4 | |
| 0366 | 85 | ADD | L | |
| 0367 | 1F | RAR | | |
| 0368 | 47 | MOV | B,A | |
| 0369 | 79 | MOV | A,C | REPEAT |
| 036A | 1F | RAR | | |
| 036B | 4F | MOV | C,A | |
| 036C | 78 | MOV | A,B | |
| 036D | D27103 | JNC | $+4 | |
| 0370 | 85 | ADD | L | |
| 0371 | 1F | RAR | | |
| 0372 | 47 | MOV | B,A | |
| 0373 | 79 | MOV | A,C | REPEAT |
| 0374 | 1F | RAR | | |
| 0375 | 4F | MOV | C,A | |
| 0376 | 78 | MOV | A,B | |
| 0377 | D27B03 | JNC | $+4 | |
| 037A | 85 | ADD | L | |
| 037B | 1F | RAR | | |
| 037C | 47 | MOV | B,A | |
| 037D | 79 | MOV | A,C | REPEAT |
| 037E | 1F | RAR | | |
| 037F | 4F | MOV | C,A | |
| 0380 | 78 | MOV | A,B | |
| 0381 | D28503 | JNC | $+4 | |
| 0384 | 85 | ADD | L | |
| 0385 | 1F | RAR | | |
| 0386 | 47 | MOV | B,A | |
| 0387 | 79 | MOV | A,C | REPEAT |
| 0388 | 1F | RAR | | |
| 0389 | 4F | MOV | C,A | |
| 038A | 78 | MOV | A,B | |
| 038B | D28F03 | JNC | $+4 | |
| 038E | 85 | ADD | L | |
| 038F | 1F | RAR | | |
| 0390 | 47 | MOV | B,A | |
| 0391 | 79 | MOV | A,C | REPEAT |
| 0392 | 1F | RAR | | |
| 0393 | 4F | MOV | C,A | LSBYTE COMPLETE |
| 0394 | 78 | MOV | A,B | |

```
0395 D29903        JNC   $+4
0398 85            ADD   L
0399 47            MOV   B,A           MSBYTE*2
039A 7A            MOV   A,D           MOVE COMPL FLAG TO ACCUM
039B 1F            RAR                 AND SET CARRY IF 1
039C 78            MOV   A,B           PUT SWEEP VALUE IN ACCUM
039D D2A303        JNC   OUTP
03A0 2F            CMA                 COMP VALUE IF CARRY=0
03A1 C601          ADI   1             2'S COMPL
03A3 FB     OUTP:  EI                  ENABLE INTERRUPT
03A4 76            HLT
03A5 D302          OUT   2             OUTPUT SWEEP VALUE
```

UPDATE COUNTERS

```
03A7 E1            POP   H             LOWER BYTES OF COUNTER
03A8 2B            DCX   H             DECREMENT CNT BY 1
03A9 7C            MOV   A,H           MOVE TO ACCUM FOR TEST
03AA 17            RAL                 ROTATE MSB TO CARRY
03AB DAB203        JC    UPBY          LOWER COUNTER BYTES ZERO
03AE E5            PUSH  H             NOT ZERO RETURN
03AF C3CB03        JMP   TACL          START TAPER CALC
03B2 E1     UPBY:  POP   H             UPPER BYTES OF COUNTER
03B3 2B            DCX   H             DECREMENT CNT BY 1
03B4 7C            MOV   A,H           TO ACCUM FOR TEST
03B5 17            RAL                 ROTATE MSB TO CARRY
03B6 DAC103        JC    UPDT          CNT FLAG
03B9 E5            PUSH  H             NOT ZERO STORE CNT
03BA 21FF7F        LXI   H,7FFFH       CONDITION LOWER BYTES
03BD E5            PUSH  H             STORE LOWER BYTES
03BE C3CB03        JMP   TACL          CHECK FLAG
03C1 3A0F08 UPDT:  LDA   CNFL          FETCH COUNTER FLAG
03C4 3D            DCR   A             DECREMENT COUNTER
03C5 320F08        STA   CNFL          STORE FLAG
03C8 FA9700        JM    START         END OF SWEEP START OVER
```

CALCULATE NEW VALUE OF TF

```
03CB 3A0F08 TACL:  LDA   CNFL          FETCH COUNTER FLAG
03CE FE01          CPI   1             COMPARE TO ONE
03D0 CAF003        JZ    CALC          EQUAL NO TAPER
03D3 DADC03        JC    ETCL          END TAPER CALC
03D6 011C08 BTCL:  LXI   B,DT
03D9 C3DF03        JMP   $+6           SKIP ETF
03DC 011F08 ETCL:  LXI   B,CDT
03DF 212208        LXI   H,TF
03E2 AF            XRA   A             ZERO CARRY
03E3 0A            LDAX  B             TF IN ACCUM
03E4 8E            ADC   M             DELTA TF + TF WITH CARRY
03E5 77            MOV   M,A           1ST BYTE OF NEW TF
03E6 03            INX   B             ADDR OF TF+1
03E7 23            INX   H             ADDR OF DELTA TF
03E8 0A            LDAX  B             TF1 IN ACCUM
03E9 8E            ADC   M             ADDS DF+1 TO TF+1 WITH CARRY
03EA 77            MOV   M,A           2ND BYTE OF NEW TF
03EB 03            INX   B             ADDR OF DF+2
03EC 23            INX   H
03ED 0A            LDAX  B
03EE 8E            ADC   M
03EF 77            MOV   M,A           3RD BYTE OF NEW TF
```

CALCULATE NEW VALUE OF J

```
03F0  3A0A08    CALC:   LDA   K+1        LOAD FRACTION OF K
03F3  17                RAL              ROTATE UPPER BIT INTO CARRY
03F4  010B08            LXI   B,K+2      ADDR OF K+2
03F7  210D08            LXI   H,J        ADDR OF J
03FA  0A                LDAX  B          PUT K+2 IN ACCUM
03FB  8E                ADC   M          ADD J TO K+2 WITH CARRY
                                         IF K FRACTION 1/2 OR LARGER
03FC  77                MOV   M,A        LOWER BYTE OF NEW J
03FD  03                INX   B          ADDR OF K+3
03FE  23                INX   H          ADDR OF J+1
03FF  0A                LDAX  B          K+3 IN ACCUM
0400  8E                ADC   M          ADD J+1 TO K+3
0401  77                MOV   M,A        UPPER BYTE OF NEW J
0402  5F                MOV   E,A        LOWER BYTE OF TABLE ADDR
0403  D20A04            JNC   SAME       CHECK FOR OVERFLOW
0406  7A                MOV   A,D        UPDATE COMPL FLAG
0407  CE00              ACI   0          ADDS COMPL FLAG TO CARRY
0409  57                MOV   D,A        SAVE UPDATED COMPL FLAG
```

CALCULATE NEW K VALUE

```
040A  AF        SAME:   XRA   A          ZERO ACCUM
040B  011708            LXI   B,DF       ADDR OF DF
040E  210908            LXI   H,K        ADDR OF K
0411  0A                LDAX  B          DF IN ACCUM
0412  8E                ADC   M          ADD DF TO K WITH CARRY
0413  77                MOV   M,A        LOWER BYTE OF K
0414  03                INX   B          ADDR DF+1
0415  23                INX   H          ADDR K+1
0416  0A                LDAX  B          DF+1 IN ACCUM
0417  8E                ADC   M          ADD DF+1 TO K+1 WITH CARRY
0418  77                MOV   M,A        2ND BYTE OF K
0419  03                INX   B          ADDR OF DF+2
041A  23                INX   H          ADDR OF K+2
041B  0A                LDAX  B          DF+2 IN ACCUM
041C  8E                ADC   M          ADDS DF+2 to K+2 WITH CARRY
041D  77                MOV   M,A        3RD BYTE OF K
041E  03                INX   B          ADDR OF DF+3
041F  23                INX   H          ADDR OF K+3
0420  0A                LDAX  B          DF+3 IN ACCUM
0421  8E                ADC   M          ADDS K+3 TO DF+3
0422  77                MOV   M,A        4TH BYTE OF K
0423  C33F03            JMP   SWEEP      READY NEXT SWEEP VALUE
```

BCD TO BINARY ROUTINE
THIS ROUTINE INPUTS A BCD DIGIT AND
CONVERTS IT TO A BINARY NUMBER
L REG IS USED FOR MULTIPLIER
D REG IS USED FOR MULTIPICANT
H AND L REGS USED FOR RESULT
E REG IS USED FOR BIT COUNTER
C REG IS USED FOR DIGIT COUNTER

```
0426  2600      BCD:    MVI   H,0        INIT THE MS BYTE
0428  2E00              MVI   L,0        INIT THE LS BYTE
042A  160A              MVI   D,10       MULTIPLICAND
042C  DB02      INPT:   IN    2          INPUT VALUE
042E  E60F              ANI   0FH        ZERO UPPER BYTE
0430  85                ADD   L          ADD L TO ACCUM
0431  6F                MOV   L,A        STORE VALUE IN L
```

```
0432 3E01            MVI    A,1        CLOCK THE MULTIPLIXER
0434 D301            OUT    1          TO THE NEXT DIGIT
0436 AF              XRA    A
0437 D301            OUT    1
0439 0D              DCR    C          DECR DIGIT COUNT
043A CA5304          JZ     VLCM       VALUE COMPLETE
043D 1E09            MVI    E,9        BIT COUNTER
043F 7D     MULT0:   MOV    A,L        ROTATE LSB OF MULTIPLIER
0440 1F              RAR               TO CARRY AND SHIFT LOW
0441 6F              MOV    L,A        ORDER BYTE OF RESULT
0442 1D              DCR    E
0443 CA5004          JZ     NXDT       NEXT DIGIT
0446 7C              MOV    A,H
0447 D24B04          JNC    MULT1      CY=0 DO NOT ADD 10
044A 82              ADD    D          CY=1 ADD 10
044B 1F     MULT1:   RAR               SHIFT HIGH ORDER BYTE
044C 67              MOV    H,A
044D C33F04          JMP    MULT0      NEXT BIT
0450 C32C04 NXDT:    JMP    INPT        INPUT NEXT DIGIT
0453 C9     VLCM:    RET               VALUE COMPLETE RETURN

SHIFT LEFT ROUTINE
            USES H AND L REG FOR DATA
            USES B REG FOR COUNTER 0454 7D     SHFTL:   MOV    A,L
0455 07              RLC
0456 6F              MOV    L,A
0457 7C              MOV    A,H
0458 17              RAL
0459 67              MOV    H,A
045A 05              DCR    B
045B C25404          JNZ    SHFTL
045F C9              RET

DIVIDE ROUTINE
            USES E FOR COUNTER
            USES B AND C FOR DIVIDEND
            USES D FOR DIVISOR
            8 BIT QUOTIENT IS IN C
            WITH REMAINDER IN B 045F 1E09   DIV:     MVI    E,9        BIT COUNTER
0461 78              MOV    A,B
0462 47     DIV0:    MOV    B,A
0463 79              MOV    A,C        ROTATE CARRY INTO C
0464 17              RAL               REG. ROTATE NEXT MSB TO CARRY
0465 4F              MOV    C,A
0466 1D              DCR    E
0467 CA7B04          JZ     DIV2
046A 78              MOV    A,B        ROTATE MSB TO
046B 17              RAL               HIGH ORDER QUOTIENT
046C D27304          JNC    DIV1
046F 92              SUB    D          SUBTRACT DIVISOR & LOOP
0470 C36204          JMP    DIV0
0473 92     DIV1:    SUB    D
0474 D26204          JNC    DIV0
0477 82              ADD    D
0478 C36204          JMP    DIV0
047B 3EFF   DIV2:    MVI    A,0FFH
047D A9              XRA    C
047E 77              MOV    M,A
047F C9              RET
```

The pseudo-random code values and sweep table values constitute 128 and 256 addressable values, respectively, as addressed consecutively. In abreviated form, the program is as follows:

| ASSEMBLY CODE | SOURCE CODE |
|---|---|

PSEUDO-RANDOM CODE VALUES

| ASSEMBLY CODE | SOURCE CODE |
|---|---|
| 0480 18 | DB 18H |
| 0481 18 | DB 18H |
| 0482 18 | DB 18H |
| 0483 18 | DB 18H |
| 0484 18 | DB 18H |
| 0485 18 | DB 18H |
| 0486 18 | DB 18H |
| 0487 08 | DB 08H |
| 0488 08 | DB 08H |
| 0489 08 | DB 08H |
| 048A 08 | DB 08H |
| 048B 08 | DB 08H |
| 048C 08 | DB 08H |
| 048D 18 | DB 18H |
| 048E 08 | DB 08H |
| 048F 08 | DB 08H |
| 0490 08 | DB 08H |
| 0491 08 | DB 08H |
| 0492 08 | DB 08H |
| * * | * * |
| * * | * * |
| * * | * * |
| * * | * * |
| * * | * * |
| * * | * * |
| 04F2 18 | DB 18H |
| 04F3 08 | DB 08H |
| 04F4 08 | DB 08H |
| 04F5 18 | DB 18H |
| 04F6 18 | DB 18H |
| 04F7 08 | DB 08H |
| 04F8 08 | DB 08H |
| 04F9 18 | DB 18H |
| 04FA 08 | DB 08H |
| 04FB 18 | DB 18H |
| 04FC 08 | DB 08H |
| 04FC 08 | DB 18H |
| 04FE 08 | DB 08H |
| 04FF 18 | DB 18H |

SWEEP TABLE VALUES

| ASSEMBLY CODE | SOURCE CODE |
|---|---|
| 0500 00 | DB 0 |
| 0501 02 | DB 2 |
| 0502 03 | DB 3 |
| 0503 05 | DB 5 |
| 0504 06 | DB 6 |
| 0505 08 | DB 8 |
| 0506 09 | DB 9 |
| 0507 0B | DB 11 |
| 0508 0C | DB 12 |
| 0509 0E | DB 14 |
| 050A 10 | DB 16 |
| 050B 11 | DB 17 |

```
050C  13           DB   19
050D  14           DB   20
050E  16           DB   22
050F  17           DB   23
0510  19           DB   25
0511  1A           DB   26
0512  0C           DB   28
0513  1D           DB   29
 *     *            *    *
 *     *            *    *
 *     *            *    *
 *     *            *    *
 *     *            *    *
 *     *            *    *
 *     *            *    *
 *     *            *    *
 *     *            *    *
05ED  1D           DB   29
05EE  1C           DB   28
05EF  1A           DB   26
05F0  19           DB   25
05F1  17           DB   23
05F2  16           DB   22
05F3  14           DB   20
05F4  13           DB   19
05F5  11           DB   17
05F6  10           DB   16
05F7  0E           DB   14
05F8  0C           DB   12
05F9  0B           DB   11
05FA  09           DB    9
05FB  08           DB    8
05FC  06           DB    6
05FD  05           DB    5
05FE  03           DB    3
05FF  02           DB    2
```

IDENTIFING CONSTANTS AND STORAGE LOCATIONS

```
0800       FS    EQU   0800H     START FREQ
0802       FE    EQU   0802H     END FREQ
0804       SL    EQU   0804H     SWEEP LENGTH
0806       TL    EQU   0806H     TAPER LENGTH
0807       F1    EQU   0807H     SMALLER FREQ
0809       K     EQU   0809H     F+DF
080D       J     EQU   080DH     J(N-1)+K(N)
080F       CNFL  EQU   080FH     COUNTER FLAG
0810       CNT1  EQU   0810H     (F2-F1)/SL DIV LOOP CNT
0811       CNT2  EQU   0811H     MULTBYTE ADD CNT
0812       CNT3  EQU   0812H     DT & TC DIV LOOP CNT
0813       F     EQU   0813H     FS*2**22
0817       DF    EQU   0817H     (F2-F1)*2**22/SL*2**11
081B       UDFL  EQU   081BH     UP OR DOWN SWEEP FLAF
081C       DT    EQU   081CH     DELTA TAPER FACTOR
081F       CDT   EQU   081FH     COMPLIMENTED DELTA TAPER
                                   FACTOR
0822       TF    EQU   0822H     TAPER FACTOR
0825       DTC   EQU   0825H     DOUBLE TAPER COUNT
0827       BTC   EQU   0827H     BEGINNING TAPER COUNT
082B       SLC   EQU   082BH     SWEEP LENGTH COUNTER
082F       ETC   EQU   082FH     END TAPER COUNTER
0000             END
```

What is claimed is:

1. A method for constructing a seismic vibrator control signal, comprising:
   selecting parameter data for starting frequency, ending frequency, sweep time and taper time of said control signal;
   storing said parameter data in random access memory;
   determining the sweep rate of change per unit time;
   determining the accumulated frequency per sample point of said control signal;
   setting a unit phase accumulation counter equal to zero;
   multiplying the total sweep length time by a selected number of samples per second and setting as a total sample point count;
   initiating successive sample point digital data signals under decrement of said sample point count; and
   converting said successive digital data values to an analog control signal of the selected frequency, relative amplitude and duration of sweep length.

2. A method as set forth in claim 1 wherein said step of selecting comprises:
   manually selecting multi-digit decimal values to provide binary coded decimal input of said parameter data.

3. A method as set forth in claim 1 which is further characterized in that:
   constants for the total elapsed sweep time, frequency and current phase accumulation, are determined for each sample point.

4. Apparatus for constructing a seismic vibrator control signal, comprising:
   means for storing a selected plurality of digital amplitude and binary parameter signals in addressable location;
   input switch means providing binary coded decimal input of parameters relating to starting frequency, ending frequency, sweep time and sweep taper time of said control signal;
   means for converting said binary coded decimal inputs to said binary parameter signals for input to said means for storing;
   microprocessor means accessible to said means for storing and energizable to enable output of digital amplitude values in sequence controlled by said binary parameter signals and in the form of a digital control signal of selected frequency and duration; and
   second means for converting said digital control signal to an analog control signal for energization of a seismic vibrator.

5. Apparatus as set forth in claim 4 wherein said input switch means comprises:
   plural multi-digit decimal switches each providing one of said binary coded decimal inputs for a respective one of said parameters.

6. Apparatus as set forth in claim 5 wherein said means for converting comprises:
   input logic means sampling output of each decimal switch in sequence; and
   input flip-flop means buffering said sampled outputs via data bus for conversion to binary signals in said microprocessor means and storage in said means for storing.

7. Apparatus as set forth in claim 4 wherein said means for storing comprises:
   programmable memory accessible to said microprocessor means and containing programmed modules relating to the amplitude table for said digital amplitude.

8. Apparatus as set forth in claim 7 wherein said means for storing further comprises:
   random access memory accessible to said microprocessor means for storage of binary parameter signals, sweep length counter signals, and taper length counter signals.

9. Apparatus for constructing a seismic vibrator control signal, comprising:
   means for manually selecting sweep parameter values for each of starting frequency, ending frequency, sweep time and taper time and outputting as sweep parameter data signals;
   means for addressably storing said sweep parameter data signals;
   means accessible to said means for addressably storing for determining and storing for each of a plurality of successive sweep time sample points n at increment $\Delta t$, the sweep frequency rate of change per sample point DF and the accumulated frequency value per sample point K;
   means providing storage of a table of J amplitude values for assignment to each half cycle of sweep frequency;
   means for outputting in real time the digital sweep values for each successive sample point n; and
   means for converting and smoothing the successive digital sweep values to an analog control signal of the selected frequency, relative amplitude and duration of sweep lengths.

10. Apparatus as set forth in claim 9 wherein said means for manually selecting comprises:
    plural multi-digit decimal switches each providing a binary coded decimal output of one of said sweep parameter data values.

11. Apparatus as set forth in claim 10 wherein said means for determining comprises:
    microprocessor means in communication with said means for addressably storing.

12. Apparatus as set forth in claim 11 which further includes:
    means responsive to said microprocessor means for enabling transmission of a pseudo-random code output for synchronism of companion seismic vibrators.

* * * * *